US012018186B2

United States Patent
Wu et al.

(10) Patent No.: US 12,018,186 B2
(45) Date of Patent: Jun. 25, 2024

(54) RETORT ADHESIVE COMPOSITION

(71) Applicants: Dow Global Technologies LLC, Midland, MI (US); Rohm and Haas Company, Collegeville, PA (US)

(72) Inventors: Jie Wu, Lake Jackson, TX (US); Sudhanwa D. Dewasthale, Houston, TX (US); Mai Chen, Chicago, IL (US)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 0 days.

(21) Appl. No.: 17/621,226

(22) PCT Filed: May 19, 2020

(86) PCT No.: PCT/US2020/033612
§ 371 (c)(1),
(2) Date: Dec. 20, 2021

(87) PCT Pub. No.: WO2020/256877
PCT Pub. Date: Dec. 24, 2020

(65) Prior Publication Data
US 2022/0363965 A1 Nov. 17, 2022

Related U.S. Application Data

(60) Provisional application No. 62/862,711, filed on Jun. 18, 2019.

(51) Int. Cl.
*C09J 175/08* (2006.01)
*B32B 1/00* (2006.01)
(Continued)

(52) U.S. Cl.
CPC ............... *C09J 175/08* (2013.01); *B32B 1/00* (2013.01); *B32B 7/12* (2013.01); *B32B 15/085* (2013.01);
(Continued)

(58) Field of Classification Search
CPC ....... C09J 175/08; C09J 5/00; C08G 18/7671; C08G 18/4829; C08G 18/10; C08G 18/3885; C08G 18/6666
See application file for complete search history.

(56) References Cited

U.S. PATENT DOCUMENTS

| 4,734,303 A | 3/1988 | Fujiwara et al. |
| 5,144,824 A | 9/1992 | Kobayashi et al. |

(Continued)

FOREIGN PATENT DOCUMENTS

| CN | 103450443 A | 12/2013 |
| CN | 108728032 A | 11/2018 |

(Continued)

OTHER PUBLICATIONS

PCT/US2020/033612, International Search Report and Written Opinion with a mailing date of Aug. 13, 2020.
(Continued)

*Primary Examiner* — Michael L Leonard
(74) *Attorney, Agent, or Firm* — Boyle Fredrickson, S.C.

(57) ABSTRACT

A solvent-based polyurethane retort adhesive system for producing laminates including: (A) at least one isocyanate compound, Component A, comprising: a blend of: (i) at least one aliphatic-based isocyanate and (ii) at least one aromatic-based isocyanate; and (B) at least one isocyanate-reactive component, Component B, comprising: (i) at least one phosphate ester compound and (ii) at least one polyether polyol having an average molecular weight of less than 1,500 g/mol; a process for producing the above adhesive; a
(Continued)

multi-layer laminate product including the above adhesive; and a process for producing a laminate product using the above adhesive.

20 Claims, 1 Drawing Sheet (51) Int. Cl.

| | |
|---|---|
| B32B 7/12 | (2006.01) |
| B32B 15/085 | (2006.01) |
| B32B 15/09 | (2006.01) |
| B32B 15/20 | (2006.01) |
| B32B 27/16 | (2006.01) |
| B32B 27/32 | (2006.01) |
| B32B 27/36 | (2006.01) |
| B32B 37/12 | (2006.01) |
| B65D 65/40 | (2006.01) |
| C08G 18/10 | (2006.01) |
| C08G 18/38 | (2006.01) |
| C08G 18/48 | (2006.01) |
| C08G 18/66 | (2006.01) |
| C08G 18/76 | (2006.01) |
| C09J 5/00 | (2006.01) |
| C09J 175/00 | (2006.01) |

(52) U.S. Cl.
CPC .............. *B32B 15/09* (2013.01); *B32B 15/20* (2013.01); *B32B 27/16* (2013.01); *B32B 27/32* (2013.01); *B32B 27/36* (2013.01); *B32B 37/1284* (2013.01); *B65D 65/40* (2013.01); *C08G 18/10* (2013.01); *C08G 18/3885* (2013.01); *C08G 18/4829* (2013.01); *C08G 18/6666* (2013.01); *C08G 18/7671* (2013.01); *C09J 5/00* (2013.01); *B32B 2255/06* (2013.01); *B32B 2255/10* (2013.01); *B32B 2255/26* (2013.01); *B32B 2305/72* (2013.01); *B32B 2307/31* (2013.01); *B32B 2307/718* (2013.01); *B32B 2307/732* (2013.01); *B32B 2311/24* (2013.01); *B32B 2323/10* (2013.01); *B32B 2367/00* (2013.01); *B32B 2439/46* (2013.01); *B32B 2439/70* (2013.01); *C09J 2475/00* (2013.01)

(56) References Cited

U.S. PATENT DOCUMENTS

| | | |
|---|---|---|
| 5,202,391 A | 4/1993 | Yamazaki et al. |
| 5,360,649 A | 11/1994 | Sato et al. |
| 6,022,913 A | 2/2000 | Tanaka et al. |
| 2015/0013904 A1* | 1/2015 | Tribelhorn ............. C08G 18/79 |
| | | 524/789 |
| 2017/0226391 A1* | 8/2017 | Vietti ................. C08G 18/5081 |
| 2017/0306200 A1 | 10/2017 | Zupancic et al. |
| 2017/0321095 A1 | 11/2017 | Pela et al. |
| 2019/0127617 A1 | 5/2019 | Bai et al. |
| 2019/0270918 A1* | 9/2019 | Seehagen ........... C08G 18/4829 |
| 2020/0181467 A1* | 6/2020 | Xie ........................ B32B 27/08 |

FOREIGN PATENT DOCUMENTS

| | | |
|---|---|---|
| WO | 2018013221 A1 | 1/2018 |
| WO | 2019045868 A1 | 3/2019 |

OTHER PUBLICATIONS

PCT/US2020/033612, International Preliminary Report on Patentability with a mailing date of Dec. 21, 2021.

* cited by examiner

RETORT ADHESIVE COMPOSITION

FIELD

The present invention relates to a retort adhesive composition useful in a laminating process; and the preparation of such retort adhesive composition. More specifically, the present invention relates to a solvent-based retort adhesive composition for use with laminate films, the adhesive composition exhibiting regulatory compliance, fast curing and good adhesion performance; and a process of making the same.

BACKGROUND

Adhesive compositions are useful for a wide variety of purposes. For instance, some adhesives are used to adhere two or more film layers of substrates together thereby forming composite films, i.e., laminates comprising the two or more film layers. Example of substrates typically include polyethylenes, polypropylenes, polyesters, polyamides, metals, papers, or cellophane and the like. The use of adhesives in different laminating end-use applications is generally known. For example, adhesives, are generally applied between laminating films, can be used in the manufacture of film/film and film/foil laminates used in the flexible packaging industry for packaging of foodstuffs, pharmaceuticals, and industrial consumables, especially for food packaging. Laminating adhesives can be classified generally into three categories: (1) solvent-based laminating adhesives, (2) solventless laminating adhesives, and (3) water-based laminating adhesives. The performance of an adhesive varies by category and by the application in which the adhesive is applied. Within the solvent-based category of laminating adhesives, solvent-based polyurethane has been widely used to achieve relatively good heat, moisture, and chemical resistance.

Within the category of solvent-based laminating adhesives, there are many varieties; and one particular variety includes multi-component polyurethane-based laminating adhesives; and more specifically a two-component adhesive. Typically, a two-component polyurethane-based laminating adhesive includes a first component comprising an isocyanate and/or a polyurethane prepolymer and a second component comprising one or more polyols. A polyurethane prepolymer can be obtained by the reaction of a polyisocyanate with a polyether polyol and/or polyester polyol. The second component comprises polyether polyols and/or polyester polyols. Each component can optionally include one or more additives. Common solvents used in such systems include methyl ethyl ketone, ethyl acetate, toluene and the like, all of which must be moisture-free to prevent premature reaction of the isocyanate groups of the polyurethane.

The two components (i.e., the isocyanate and polyol components) of the adhesive composition are combined in a predetermined ratio, thereby forming an adhesive composition. The adhesive composition, carried in a solvent, is then applied on a film/foil substrate. The solvent is evaporated from the applied adhesive composition. Another film/foil substrate is then brought into contact with the other substrate, forming a curable laminate structure. The laminate structure is cured to bond the two substrates together.

Solvent-based adhesive compositions can be used in high-performance laminate applications (e.g., retort, hot-fill, boil-in-bag, etc.). For example, in retort flexible packages applications, the retort flexible packages offer several benefits, such as (1) consumer convenience, (2) a long shelf life of food packed in the packages, and (3) preservation of the original flavor of the packed food. Retort flexible packages such as retort pouches are commonly constructed with multilayer lamination structures, such as a three-ply structure or a four-ply structure. The three-ply structure generally includes, for example, an outside layer of polyethylene terephthalate (PET), a middle layer of a metal foil (e.g., aluminum), and an inside layer of casted polypropylene (CPP); and the three-ply structure is generally indicated as PET//Foil//CPP. The four-ply structure generally includes, for example, an outside layer of PET, a first top middle layer of a metal foil, a second bottom middle layer of Nylon, and an inside layer of CPP; and the four-ply structure is generally indicated as PET//Foil//Nylon//CPP. A laminating adhesive is applied to the structures to bond the different layers together. The laminating adhesives used for retort flexible package applications must not only meet the extreme performance requirements at high temperature in the presence of highly acidic and fatty food, such as at a temperature of 121 degrees Celsius (° C.) for 1 hour (hr) or 132° C. for 30 minutes (min); but the laminating adhesives must also meet very strict regulatory standards such as the regulations promulgated by the Federal Department of Administration (FDA) and the European Union (EU).

There are basically four kinds of known retort adhesives. Two adhesives are based on an aliphatic isocyanate, which meet regulatory compliance, but the curing of such aliphatic-based isocyanate adhesives is very slow, and the adhesives have performance issues. The other two types of adhesive contain aromatic isocyanates; and such aromatic-based isocyanate adhesives have fast curing but such adhesives do not meet regulatory compliance for retort applications and the adhesives also have performance issues. The prior art does not disclose an "all-in-one" retort adhesive which meets regulatory compliance, has a fast curing property, and has good adhesion properties for retort applications.

For example, the known laminating adhesives for retort applications: (1) exhibit good adhesion performance for a wide range of retort substrates and structures, and the adhesives are generally compliant with global food regulations for retort applications; but the adhesives exhibit a slow curing property, such as being curable above 40° C. for at least 10 days, before packaging foodstuff in packages made using the known laminating adhesives; or (2) are generally compliant with global food regulations for retort applications; but the adhesives exhibit a slow curing property, such as being curable above 40° C. for at least 10 days, before packaging foodstuff in packages made using the known laminating adhesives; and the adhesives do not exhibit good adhesion performance for a wide range of retort substrates and structures; or (3) exhibit a fast curing property, such as being curable at ambient conditions in 10 days or at an evaluated temperature (e.g., greater than or equal to (≥) 40° C.) in five days; and the adhesives exhibit good adhesion performance on typical retort substrates and structures; but the adhesives are generally not compliant with global food regulations for retort applications, for example, the adhesives have issues complying with FDA and EU regulations. It is also known that aromatic-based adhesives do not exhibit good adhesion performance.

It is therefore desirous to provide a retort adhesive that, not only exhibits excellent adhesion performance, heat resistance, and chemical resistance; but also exhibits a fast curing characteristic (i.e., a curing time of less than [<] eight days) at ambient curing conditions and a curing time of <five days at an evaluated temperature (e.g., ≥40° C.). At the same time, it is desirous to provide a retort adhesive that meets regulatory compliance. For instance, adhesives containing aromatic polyisocyanates such as methylene diphenyl diisocyanate (MDI) and toluene diisocyanate (TDI) can produce primary aromatic amines such as methylene diphenyl diamine (MDA) and toluene diamine (TDA) that are undesirable and can potentially migrate into food from the adhesive. Generally, to be in compliance with typical government regulations, the regulations require that the total amount of migrated aromatic amines such as MDA and TDA, into food packed in packages using retort adhesives need to be very low, for example, in the parts per billion (ppb) level to be in compliant with FDA and EU food regulations, after the adhesives are subjected to severe retort testing conditions.

SUMMARY

In the present invention a novel solvent-based adhesive is disclosed which exhibits the desired performance attributes and solves the problems of the previously known adhesives used for retort applications. In one embodiment, the present invention is directed to a multi-component (e.g., a two-component) solvent-based polyurethane retort adhesive composition for producing laminates including an isocyanate component, Component A, and an isocyanate group (NCO)-reactive component, Component B. In a preferred embodiment, the adhesive composition includes, for example: (A) at least one isocyanate compound; wherein the at least one isocyanate compound, Component A, comprises a blend of: (i) at least one aliphatic-based isocyanate and (ii) at least one aromatic-based isocyanate; and (B) at least one isocyanate group (NCO)-reactive component; wherein the at least one isocyanate-reactive component, Component B, comprises: (i) at least one phosphate ester compound and (ii) at least one polyol comprising a polyether polyol having the appropriate molecular weight distribution such as having an average molecular weight (Mw) of <1,500 grams per mole (g/mol).

In other embodiments, the present invention includes a process for producing the above adhesive; a multi-layer laminate product including the above adhesive; and a process for producing a laminate product using the above adhesive.

DETAILED DESCRIPTION

Figure 1:
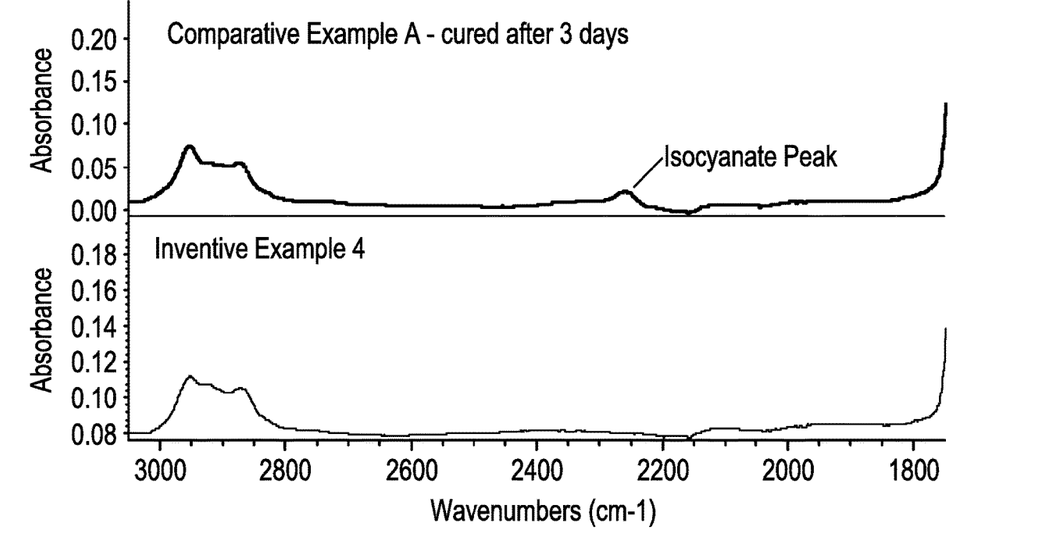
FIG. 1 is a graphical illustration showing an attenuated total reflectance (ATR) of inventive and comparative samples after 3 days curing at an elevated temperature of 50° C.

The numerical ranges disclosed herein include all values from, and including, the lower and upper value. For ranges containing explicit values (e.g., a range from 1, or 2, or 3 to 5, or 6, or 7), any subrange between any two explicit values is included (e.g., the range 1 to 7 above includes subranges 1 to 2; 2 to 6; 5 to 7; 3 to 7; 5 to 6; etc.).

The term "composition" refers to a mixture of materials which comprise the composition, as well as reaction products and decomposition products formed from the materials of the composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

An "isocyanate" is a chemical that contains at least one isocyanate group in its structure. An isocyanate group is represented by the formula: —N=C=O or abbreviated as "NCO". An isocyanate that contains more than one, or at least two, isocyanate groups is a "polyisocyanate." An isocyanate that has two isocyanate groups is a diisocyanate and an isocyanate that has three isocyanate groups is a triisocyanate, etc. An isocyanate may be aromatic or aliphatic.

A "polyisocyanate" is a molecule that contains at least two isocyanate groups.

A "polyether" is a compound containing two or more ether linkages in the same linear chain of atoms.

A "polyester" is a compound containing two or more ester linkages in the same linear chain of atoms.

A "polyol" is an organic compound containing multiple hydroxyl (OH) groups. In other words, a polyol contains at least two OH groups. Nonlimiting examples of suitable polyols include diols having two OH groups, triols having three OH groups, and tetraols having four OH groups.

A "polyester polyol" is a compound that contains a polyester and a polyol in the backbone structure of the compound.

A "polyether polyol" is a compound that contains a polyether and a polyol in the backbone structure of the compound.

A "film," including when referring to a "film layer" in a thicker article, unless expressly having the thickness specified, includes any thin, flat extruded or cast thermoplastic article having a generally consistent and uniform thickness of about 0.5 millimeters (mm) (20 mils) or less in one dimension.

A "polymer film" is a film that is made of a polymer or a mixture of polymers. The composition of a polymer film is typically, 80 percent by weight (wt %) of one or more polymers.

A "polymer" is a polymeric compound prepared by polymerizing monomers, whether of the same or a different type. The generic term polymer thus embraces the term "homopolymer" (employed to refer to polymers prepared from only one type of monomer, with the understanding that trace amounts of impurities can be incorporated into the polymer structure), and the term "interpolymer," which includes copolymers (employed to refer to polymers prepared from two different types of monomers), terpolymers (employed to refer to polymers prepared from three different types of monomers), and polymers prepared from more than three different types of monomers. Trace amounts of impurities, for example, catalyst residues, may be incorporated into and/or within the polymer. It also embraces all forms of copolymer, e.g., random, block, etc. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to as being based on "units" that are the polymerized form of a corresponding monomer.

It is well established in the art of adhesives that to make a two-part adhesive system includes providing a first part comprising an isocyanate-containing component (herein Component A); providing a second part comprising an NCO reactive component such as a polyol component (herein Component B); and then combining or mixing Component A and Component B to form the two-part adhesive system or composition.

In one broad embodiment, the present invention is directed to at least a solvent-based polyurethane retort adhesive for producing a laminate including a Component A comprising at least one isocyanate-containing compound; and a Component B comprising at least one NCO reactive component; wherein the at least one NCO reactive component contains (i) at least one phosphate ester compound and (ii) at least one polyol comprising a polyether polyol having an average Mw of <1,500 g/mol. The phosphate ester polyol in the at least one NCO reactive component can be present in a concentration of, for example, from 0.1 wt % to 30 wt % in one embodiment. In a first preferred embodiment, the at least one isocyanate compound of the adhesive is, for example, at least one aliphatic-based isocyanate. In a second preferred embodiment, the at least one isocyanate compound is a blend of (i) at least one aromatic-based isocyanate and (ii) at least one aliphatic-based isocyanate. In the second preferred embodiment, the at least one aromatic-based isocyanate can be an isocyanate prepolymer comprising a reaction product of (i) at least one polyisocyanate and (ii) at least one polyether polyol having a Mw of >1,500 g/mol.

The unique adhesive of the present invention has several advantages over the heretofore known solvent-based polyurethane retort adhesive systems including, for example, (1) good adhesion performance; (2) a fast curing property; and (3) either (a) no level of aromatic amine migration or (b) a very low level of aromatic amine migration. The unique solvent-based polyurethane retort adhesive system, in turn, is useful in a process of making a laminate having good heat resistance and good chemical resistance for use in making a retort packaging article.

As aforementioned, the at least one isocyanate-containing compound, Component A, used to make the solvent-based polyurethane retort adhesive of the present invention is, for example, a blend of (i) at least one aliphatic-based isocyanate and (ii) at least one aromatic-based isocyanate, in another embodiment. The isocyanate-containing compound useful in the present invention can be selected, for example, from the group consisting of an isocyanate monomer, a polyisocyanate (e.g., dimers, trimmers, etc.), an isocyanate prepolymer, and mixtures of two or more thereof. As used herein, a "polyisocyanate" is any compound that contains two or more isocyanate groups.

Further, the isocyanate-containing compound can be selected from the group consisting of aliphatic polyisocyanates, cycloaliphatic polyisocyanates, aromatic polyisocyanates, and combinations of two or more thereof. An "aliphatic polyisocyanate" is a polyisocyanate that contains no aromatic rings. A "cycloaliphatic polyisocyanate" is a subset of aliphatic polyisocyanates, wherein the chemical chain is ring-structured. An "aromatic polyisocyanate" is a polyisocyanate that contains one or more aromatic rings.

The aliphatic-based isocyanate component, component (i) of Component A, useful in the present invention can include one or more compounds including, for example, aliphatic polyisocyanates having 3 carbon atoms (C) to 16 C in one embodiment, and 4 C to 12 C in another embodiment, in the linear or branched alkylene residue. Also suitable for use in the present invention are cycloaliphatic polyisocyanates including, for example, cycloaliphatic polyisocyanates having 4 C to 18 C in one embodiment, and 6 C to 15 C in another embodiment, in the cycloalkylene residue. Cycloaliphatic diisocyanates refer to both cyclically and aliphatically bound NCO groups, such as isophorone diisocyanate and diisocyanatodicyclohexylmethane ($H_{12}$MDI).

Examples of suitable aliphatic polyisocyanates and cycloaliphatic polyisocyanates useful in the present invention include, but are not limited to, cyclohexane diisocyanate, methylcyclohexane diisocyanate, ethylcyclohexane diisocyanate, propylcyclohexane diisocyanate, methyldiethylcyclohexane diisocyanate, propane diisocyanate, butane diisocyanate, pentane diisocyanate, hexane diisocyanate, heptane diisocyanate, octane diisocyanate, nonane diisocyanate, nonane triisocyanate, such as 4-isocyanatomethyl-1,8-octane diisocyanate (TIN), decane di- and triisocyanate, undecane di- and triisocyanate and dodecane di- and triisocyanate, hexamethylene diisocyanate (HDI), diisocyanatodicyclohexylmethane ($H_{12}$MDI), 2-methylpentane diisocyanate (MPDI), 2,2,4-trimethylhexamethylene diisocyanate/2,4,4-trimethylhexamethylene diisocyanate (TMDI), norbornane diisocyanate (NBDI), xylylene diisocyanate (XDI), 1,4- or 1,3-bis(isocyanatomethyl)cyclohexane ($H_6$XDI), tetramethylxylylene diisocyanate, and dimers, trimers, derivatives and mixtures of the of two or more thereof. Suitable aliphatic polyisocyanates and cycloaliphatic polyisocyanates useful in the present invention also include, for example, XDI-based polyisocyanate, $H_6$XDI-based polyisocyanate, XDI isocyanurate, HDI-based polyisocyanate, $H_{12}$MDI-based polyisocyanate, HDI isocyanurate, and mixtures of two or more thereof.

In one preferred embodiment, the aliphatic-based component useful in the present invention includes, for example, XDI based polyisocyanate, HDI-based polyisocyanate and mixtures thereof.

Exemplary of some of the commercial products of aliphatic-based component useful in the present invention include, for example, TAKENATE D-110N and TAKENATE D-120N, available from Mitsui Chemical; Desmodur N 3200 and Desmodur Quix 175, available from The Coverstro Company; and mixtures thereof.

Additional isocyanate-containing compounds suitable for use according to the present disclosure include, but are not limited to, 4-methyl-cyclohexane 1,3-diisocyanate, 2-butyl-2-ethylpentamethylene diisocyanate, 3(4)-isocyanatomethyl-1-methylcyclohexyl isocyanate, 2-isocyanatopropyl-cyclohexyl isocyanate, 2,4'-methylenebis(cyclohexyl) diisocyanate, 1,4-diisocyanato-4-methyl-pentane, and mixtures of two or more thereof.

Also, isocyanate-containing compounds suitable for use, as component (i) of Component A, according to the present disclosure include, for example, isocyanate prepolymers. "Isocyanate prepolymers" are reaction products of a polyisocyanate and an isocyanate reactive component at a stoichiometry ratio (NCO/OH) greater than (>) 2.0 in one embodiment, from 3.0 to 10.0 in another embodiment, and from 4.0 to 7.0 in still another embodiment. The polyisocyanate is selected, for example, from aromatic polyisocyanates, aliphatic polyisocyanates, cycloaliphatic polyisocyanates, and mixtures thereof, as described above. Suitable isocyanate reactive components that can react with the polyisocyanates to form the isocyanate prepolymers, also known as "polyurethane prepolymers," include, for example, compounds with hydroxyl groups, amino groups, and thio groups. The isocyanate reactive components that can react with the polyisocyanates to form the isocyanate prepolymers useful in the present invention include, for example, a polyether polyol, a polyester polyol, a polycaprolactone polyol, a polyacrylate, a polycarbonates polyol, a natural oil-based polyol, and mixtures of two or more thereof.

The isocyanate reactive components that can react with the polyisocyanates to form the isocyanate prepolymers useful in the present invention can also be characterized by the isocyanate reactive component's hydroxyl number and its hydroxyl group functionality. "Hydroxyl number" or "hydroxyl value" is a measure of the content of free hydroxyl groups in a chemical substance. The hydroxyl number is the number of milligrams of potassium hydroxide (KOH) required to neutralize the acetic acid taken up on acetylation of one gram of a chemical substance that contains free hydroxyl groups. Hydroxyl number (OHN) is usually expressed as milligrams of potassium hydroxide per gram (mg KOH/g) of the chemical substance. The hydroxyl number is determined in accordance with DIN 53240.

"Hydroxyl group functionality" is the number of hydroxyl groups present in one molecule of a compound. Hydroxyl group functionality is measured in accordance with ASTM D4274-16 with results reported as an integer of from 1 or more in one embodiment and from 1 to 6 in another embodiment.

In some embodiments, the average hydroxyl number for the isocyanate reactive component can be, for example, from 1 mg KOH/g to 2,000 mg KOH/g in one embodiment, 5 mg KOH/g to 2,000 mg KOH/g in another embodiment, from 14 mg KOH/g to 850 mg KOH/g in still another embodiment, from 28 mg KOH/g to 500 mg KOH/g in yet another embodiment, and from 35 mg KOH/g to 450 KOH/g in even still another embodiment. In some embodiments, the average molar mass of the isocyanate reactive component is, for example, from 62 g/mol to 20,000 g/mol in one embodiment, from 250 g/mol to 12,000 g/mol in another embodiment, from 500 g/mol to 6,000 g/mol in still another embodiment, and from 800 g/mol to 3,000 g/mol in yet another embodiment.

In some embodiments, the average hydroxyl group functionality of the isocyanate reactive component can be, for example, from 1.0 to 6.0 in one embodiment, from 1.8 to 4.0 in another embodiment, and from 2.0 to 3.0 in still another embodiment. One of the advantageous properties exhibited by the aliphatic-based component of the present invention includes, for example, providing an adhesive which can be compliant with broad governmental regulations.

Compounds having isocyanate groups are also characterized by a weight percentage of isocyanate groups based on a total weight of the compound. The weight percentage of isocyanate groups is termed "% NCO" and is measured in accordance with ASTM D2572-97.

The amount of the aliphatic-based component used in the present invention process includes, for example, from 30 wt % to 100 wt % in one embodiment, from 40 wt % to 90 wt % in another embodiment and from 50 wt % to 80 wt % in still another embodiment, based on the total amount of the components in Component A.

The aromatic-based isocyanate component, component (ii) of Component A, useful in the present invention can include, for example, one or more polyisocyanate compounds including, but are not limited to, for example 1,3- and 1,4-phenylene diisocyanate; 1,5-naphthylene diisocyanate; 2,6-tolulene diisocyanate (2,6-TDI); 2,4-tolulene diisocyanate (2,4-TDI); 2,4'-diphenylmethane diisocyanate (2,4'-MDI); 4,4'-diphenylmethane diisocyanate (4,4'-MDI); 3,3'-dimethyl-4,4'-biphenyldiisocyanate (TODI) and isomers thereof; polymeric isocyanates; and mixtures of two or more thereof.

Exemplary of some of the commercial aromatic-based components useful in the present invention can include, for example, Isonate 125 M, ADCOTTE L76-204, Coreactant CT, and Catalyst F, available from The Dow Chemical Company; Desmodur® E 2200/76, available from The Covestro Company; and mixtures thereof. One of the advantageous properties exhibited by the aromatic-based component of the present invention includes, for example, providing an adhesive which can be fast curing.

The amount of the aromatic-based isocyanate component used in the present invention process is, for example, from 5 wt % to 95 wt % in one embodiment, from 20 wt % to 90 wt % in another embodiment and from 30 wt % to 90 wt % in still another embodiment, based on the total amount of the components in Component A.

As aforementioned, the at least one NCO reactive component, Component B, used to make the adhesive is; for example, at least one NCO reactive component that contains (i) at least one phosphate ester compound and (ii) at least one polyol comprising a polyether polyol having an average Mw of <1,500 g/mol. As used herein, a "polyol" refers to a compound having two or more hydroxy groups (i.e., —OH) per molecule. As used herein, an "ether" refers to a compound that contains an ether linkage. As used herein, a "polyether" refers to a compound that contains two or more ether linkages per molecule. A compound that is both a polyether and a polyol is referred to herein as a "polyether polyol." An "aliphatic polyether polyol" is a polyether polyol that contains no aromatic ring in its molecule. An "aromatic polyether polyol" is a polyether polyol that contains one or more aromatic rings in its molecule.

In one embodiment, the phosphate ester compound, component (i) of Component B, useful in the present invention can be selected, for example, from a phosphate ester compound having the following chemical Structure (I):

Structure (I)

where $R^1$ is any organic group. In addition to the pendant groups shown in Structure (I), $R^1$ may or may not have one or more additional pendant —OH groups, and $R^1$ may or may not have one or more additional pendant groups of Structure (I). Any two or more of the —OH groups and the group(s) of Structure (I) may or may not be attached to the same atom of $R^1$. In a preferred embodiment, each —OH group and each group of Structure (I) is attached to a separate atom of $R^1$.

A convenient way to characterize $R^1$ is to describe the compound having the following Structure (II):

Structure (II)

where $R^1$ is the same as in Structure (I). The compound having Structure (II) is referred to herein as a "precursor polyol."

In some embodiments, suitable precursor polyols have number average Mw of 90 g/mol or higher in one embodiment, 200 g/mol or higher in another embodiment, and 400 g/mol or higher in still another embodiment. In some embodiments, suitable precursor polyols have number average Mw of 4,000 g/mol or lower in one embodiment, 2,000 g/mol or lower in another embodiment, 1,200 g/mol or lower in still another embodiment, 900 g/mol or lower in yet another embodiment, and 500 g/mol or lower in even still another embodiment. In some embodiments, suitable precursor polyols have number average Mw of from 200 g/mol to 4,000 g/mol in one embodiment, from 400 g/mol to 2,000 g/mol in another embodiment, from 400 g/mol to 1,200 g/mol in still another embodiment, and from 400 g/mol to 900 g/mol in yet another embodiment.

In some embodiments, suitable precursor polyols are alkyl higher polyols, monosaccharides, disaccharides, and compounds having the following Structure (III):

Structure (III)

where each of $R^2$, $R^3$, $R^4$, and $R^5$ is, independent of the other, any organic group; each of $n_1$, $n_2$, and $n_3$ is, independent of the other, an integer from 0 to 10. In addition to the pendant groups shown in Structure (III), $R^2$ may or may not have one or more additional pendant groups. It is further understood that any two or more of the pendant groups may or may not be attached to the same atom of $R^2$. In some embodiments, a mixture of compounds having Structure (III) is present, where the compounds of Structure (III) differ from each other in the value of one or more of $n_1$, $n_2$, and $n_3$. Such mixtures are described herein by stating a non-integer value for the parameter $n_1$, $n_2$, or $n_3$, where the non-integer value represents the number average of that parameter. When it is desired to assess the molecular weight of such a mixture, the number-average molecular weight is used.

Among precursor polyols having Structure (III), in one preferred embodiment each pendant group is attached to a separate atom of $R^2$. Among precursor polyols having Structure (III), in another preferred embodiment, one or more of $R^3$, $R^4$, and $R^5$ is a hydrocarbon group having 1 C to 4 C in one embodiment, 2 C to 3 C in another embodiment, and 3 C in still another embodiment. Among precursor polyols having Structure (III), in still another preferred embodiment, one or more of $R^3$, $R^4$, and $R^5$ is an alkyl group, which may be linear or cyclic or branched or a combination thereof; in yet another preferred embodiment, one or more of $R^3$, $R^4$, and $R^5$ is a linear or branched alkyl group; and in even still another preferred embodiment, one or more of $R^3$, $R^4$, and $R^5$ is a branched alkyl group. In even yet another preferred embodiment, $R^3$, $R^4$, and $R^5$ are identical to each other.

Among precursor polyols having Structure (III), in one preferred embodiment, one or more of $n_1$, $n_2$, and $n_3$ is from 0 to 8. Among precursor polyols having Structure (III), in another preferred embodiment, one or more of $n_1$, $n_2$, and $n_3$ is 1 or more. Among precursor polyols having Structure (III), in still another preferred embodiment, one or more of $n_1$, $n_2$, and $n_3$ is 6 or less. Among precursor polyols having Structure (III), in yet another preferred embodiment, $n_1$, $n_2$, and $n_3$ are the same as each other.

In one embodiment, the group of precursor polyols having Structure (III) are compounds in which each of $R^2$, $R^3$, $R^4$, and $R^5$ is an alkyl group; such precursor polyols are known herein as alkoxylated alkyl triols. In a triol, when at least one of $n_1$, $n_2$, and $n_3$ is 1 or more and $R^2$ has the following Structure (IV):

Structure (IV)

then the triol is known herein as an alkoxylated glycerol. In alkoxylated triols, when each of $R^3$, $R^4$, and $R^5$ is a branched alkyl group with exactly 3 C, the alkoxylated triol is known herein as a propoxylated triol. A propoxylated triol in which $R^2$ has Structure (IV) is known herein as propoxylated glycerol.

Among precursor polyols that are alkyl higher polyols, in one embodiment are compounds with 10 C or fewer carbon atoms; in another embodiment are compounds with 6 C or fewer carbon atoms; in still another embodiment are compounds with 3 C or fewer carbon atoms; and in yet another embodiment the compound is glycerol.

In even still another embodiment, precursor polyols are alkyl higher polyols and compounds having Structure (III). It is noted that, if $n_1$ is equal to (=) $n_2$=$n_3$=0 and if $R^2$ is either an alkyl group or an alkyl group having hydroxyl groups, then the compound having Structure (IV) is an alkyl higher polyol.

In one embodiment, the group of precursor polyols are alkyl triols and alkoxylated alkyl triols. Among these compounds, are glycerol and alkoxylated glycerols in one embodiment; and alkoxylated glycerols in another embodiment. Among alkoxylated glycerols, are propoxylated glycerols in one preferred embodiment.

Another class of suitable phosphate ester compounds useful in the present invention includes compounds that contain urethane linkages. Phosphate ester compounds containing urethane linkages are made by reacting one or more suitable phosphate-functional polyol with one or more polyisocyanate, and in a preferred embodiment including one or more diisocyanate. In a preferred embodiment, the amount of polyisocyanate is kept low enough so that some or all of the reaction products are phosphate-functional polyols. Alternatively, the polyol may be first reacted with the polyisocyanate to make an —OH terminated prepolymer which is then reacted with polyphosphoric acid. The phosphate ester compound with urethane linkages include those compounds having a number average Mw in the range of 1,000 g/mol to 6,000 g/mol in one general embodiment, in the range of 1,200 g/mol to 4,000 g/mol in another embodiment, and in the range of 1,400 g/mol to 3,000 g/mol in still another embodiment.

In some embodiments, the phosphate ester compound is the reaction product of reactants including a precursor polyol and a phosphoric-type acid, and the resulting phosphate ester compound has the chemical structure of Structure (I).

In one preferred embodiment, the amounts of phosphoric-type acid and precursor polyol are chosen to determine the ratio of $M_p:M_x$ as follows: $M_{hy}$=the number of hydroxyl groups per molecule of the precursor polyol; $N_x=M_{hy}-2$; $M_x$=(the moles of precursor polyol)×($N_x$); and $M_p$=the moles of phosphorous atoms contained in the phosphoric-type acid.

In general, the ratio of $M_p:M_x$ is 0.1:1 or higher in one embodiment, 0.2:1 or higher in another embodiment, 0.5:1 or higher in still another embodiment, and 0.75:1 or higher in yet another embodiment. In some embodiments, the ratio of $M_p:M_x$ is 1.1:1 or lower.

Generally, the weight ratio of phosphoric-type acid to precursor polyol is 0.005:1 or higher in one embodiment, 0.01:1 or higher in another embodiment, and 0.02:1 or higher in still another embodiment. In some embodiments, the weight ratio of phosphoric-type acid to precursor polyol is 0.3:1 or lower, or 0.2:1 or lower, or 0.12:1 or lower.

In some embodiments, the phosphoric-type acid contains polyphosphoric acid. And, in general, the amount of polyphosphoric acid in the phosphoric-type acid is, by weight based on the weight of the phosphoric-type acid, 75 wt % or more in one embodiment, 80 wt % or more in another embodiment, and 90 wt % or more in still another embodiment. Polyphosphoric acid is available in various grades; each grade is characterized by a percentage. To determine the grade, it is first recognized that pure monomeric orthophosphoric acid, the content of phosphorous pentoxide is considered to be 72.4%. Any grade of polyphosphoric acid can also be analyzed, to consider that one mole of polyphosphoric acid (formula weight labeled "Fppa") contains the number of moles of phosphorous pentoxide labeled "Nppo," and the phosphorous pentoxide percentage ("PCppo") is given by PCppo=(Nppo×142)/Fppa, expressed as a percentage. Then, the grade of that polyphosphoric acid is the ratio, expressed as a percentage: Grade=PCppo/72.4.

In some embodiments, the polyphosphoric acid used has grade of 100% or higher in one embodiment, and 110% or higher in another embodiment. In some embodiments, the polyphosphoric acid used has grade of 150% or lower in one embodiment, and 125% or lower in another embodiment.

In some embodiments, the disclosed solvent-based adhesive compositions contain one or more phosphorous-free polyols in addition to the one or more phosphate-functional polyols.

Further information about suitable phosphate esters and the preparation of such suitable phosphate esters can be found, for example, in PCT Publication No. WO/2015/168670.

Generally, the amount of the phosphate ester compound, component (i) of Component B, used in the present invention is from 0.1 wt % to 80 wt % in one embodiment, from 1 wt % to 70 wt % in another embodiment, from 5 wt % to 60 wt % in still another embodiment; from 10 wt % to 60 wt % in yet another embodiment, and from 20 wt % to 60 wt % in even still another embodiment, based on the dry weight of the polyol component, Component B.

The polyol component, component (ii) of Component B, useful in the present invention comprises at least one polyether polyol. Generally, the polyether polyol has a molecular weight of <1,500 g/mol in one embodiment, <1,000 g/mol in another embodiment, and from 50 g/mol to 1,500 g/mol in still another embodiment. In another embodiment, the polyether polyol, incorporated in the polyol component, Component B of the present invention, has a molecular weight of from 150 g/mol to 1,500 g/mol and a functionality of from 2.0 to 6.0.

Exemplary of suitable polyether polyols useful in the present invention include, but are not limited to, for example, polypropylene glycols, polytetramethylene ether glycols, polybutylene oxide-based polyols, and copolymers thereof; and mixtures thereof.

Exemplary of suitable polypropylene glycols useful in the present invention include, but are not limited to, for example, polyols based on propylene oxide, ethylene oxide, or mixture of them with initiators selected from propylene glycol, dipropylene glycol, sorbitol, sucrose, glycerin, and/or mixtures thereof. For example, the polypropylene glycols can include VORANOL™, available from The Dow Chemical Company; PLURACOL™, available from the BASF Company; POLY-G™, POLY-L™, and POLY-Q™, available from Lonza; and ACCLAIM™ available from Covestro; and mixtures thereof. In one preferred embodiment, polypropylene glycols with a functionality of between 2 to 6 and a Mw of from 250 g/mol to 1,500 g/mol are used.

Exemplary of suitable polytetramethylene ether glycols useful in the present invention include, but are not limited to, for example, POLYTHF™ available from the BASF Company; TERTHANE™ available from Invista; PTMG™ available from Mitsubishi; and PTG™ available from Dairen; and mixtures thereof. In one preferred embodiment, polytetramethylene ether glycols with a functionality of between 2 to 6 and a Mw of from 250 g/mol to 1,500 g/mol are used.

Exemplary of suitable polybutylene oxide-based polyols useful in the present invention include, but are not limited to, for example, polybutylene oxide homopolymer polyols, polybutylene oxide-polypropylene oxide copolymer polyols, and polybutylene oxide-polyethylene oxide copolymer polyols; and mixtures thereof. In one preferred embodiment, polybutylene oxide-based polyols with a functionality of from 2.0 to 4.0 and a Mw of from 150 g/mol to 1,500 g/mol are used.

In other embodiments, the polyether polyols useful in the present invention, include, but are not limited to, for example, low molecular weight glycols, including, but not limited to, for example, ethylene glycol, diethylene glycol, triethylene glycol, propylene glycol, trimethylene glycol, 1,3-butanediol, 1,4-butanediol, 1,6-hexanediol, trimethylolpropane, triisopropanolamine, neopentyl glycol; and mixtures thereof.

Generally, the amount of the polyether polyol, component (ii) of Component B, component, used in the present invention is from 20 wt % to 99.9 wt % in one embodiment, from 30 wt % to 99 wt % in another embodiment, and from 40 wt % to 95 wt % in still another embodiment, based on the dry weight of the polyol component, Component B.

In addition to the polyether polyol, component (ii) of Component B, the polyol Component B can optionally include (iii) at least one polyester polyol. Generally, the polyester polyol, component (iii) of Component B, when used, has a molecular weight of <3,000 g/mol in one embodiment, <3,500 g/mol in another embodiment, and from 500 g/mol to 3,000 g/mol in still another embodiment.

Suitable polyester polyols useful in the present invention include, but are not limited to, for example, aliphatic polyester polyols; aromatic polyester polyols; copolymers of aliphatic and aromatic polyester polyols; polycarbonate polyols; polycaprolactone polyols; and mixtures thereof. These polyester polyols: are the reaction products of polybasic acids and polyhydric alcohols; or are the reaction of phosgene or a carbonate monomer with a polyhydric alcohol; or are produced via ring opening polymerization of cyclic ester compounds.

Exemplary of suitable polybasic acids useful in the present invention include succinic acid, adipic acid, azelaic acid, sebacic acid, dodecanedicarboxylic acid, maleic anhydride, fumaric acid, 1,3-cyclopentane-dicarboxylic acid, 1,4-cyclohexanedicarboxylic acid, terephthalic acid, isophthalic acid, phthalic acid, 1,4-naphthalenedicarboxylic acid, 2,5-naphthalenedicarboxylic acid, 2,6-naphthalenedicarboxylic acid, naphthalic acid, biphenyldicarboxylic acid, 1,2-bis(phenoxy)ethane-β,p'-dicarboxylic acid, and anhydrides or ester-forming derivatives of these dicarboxylic acids; and p-hydroxybenzoic acid, p-(2-hydroxyethoxy)benzoic acid, and ester-forming derivatives or dimer acids of these dihydroxycarboxylic acids; and mixtures thereof. These polybasic acids may be used alone or in a combination of two or more polybasic acids.

Any known polyhydric alcohol can be used according to this disclosure. Non-limiting examples of suitable polyhydric alcohols useful in the present invention include: glycols such as ethylene glycol, propylene glycol, 1,3-propanediol, 1,4-butanediol, 1,5-pentanediol, 3-methyl-1,5-pentanediol, 1,6-hexanediol, neopentylglycol, methylpentanediol, dimethylbutanediol, butylethylpropanediol, diethylene glycol, triethylene glycol, tetraethylene glycol, dipropylene glycol, tripropylene glycol, bishydroxyethoxybenzene, 1,4-cyclohexanediol, 1,4-cyclohexane-dimethanol, triethylene glycol, polycaprolactone diol, dimer diol, bisphenol A, and hydrogenated bisphenol A; polyesters produced through ring opening polymerization of cyclic ester compounds such as propiolactone, butyrolactone, F-caprolactone, 8-valerolactone, and β-methyl-δ-valerolactone; and polyethers produced from addition polymerization of one or more monomers including ethylene oxide, propylene oxide, butylene oxide, styrene oxide, epichlorohydrin, tetrahydrofuran, and cyclohexylene in the usual manner with the aid of one or more compounds containing two active hydrogen atoms as an initiator, such as ethylene glycol, diethylene glycol, triethylene glycol, propylene glycol, trimethylene glycol, 1,3-butanediol, 1,4-butanediol, 1,6-hexanediol, and neopentyl glycol; and mixtures thereof. These polyhydric alcohols may be used alone or in a combination of two or more polyhydric alcohols.

Generally, the amount of the polyester polyol, optional component (iii) of Component B, which can be added to the polyol component, Component B, when used, can include, for example, from 0 wt % up to 20 wt % in one embodiment, from 0.01 wt % to 15 wt % in another embodiment, and from 0.1 wt % to 10 wt % in still another embodiment, based on the dry weight of the polyol component, Component B.

In general, the adhesive composition of the present invention includes (C) at least one solvent, as Component C. For example, but are not limited to, the solvent can be selected from the group consisting of ethyl acetate, methyl ether ketone, toluene, and mixture thereof.

The amount of the solvent, Component C, used in the present invention process can be, for example, from 20 wt % to 90 wt % in one embodiment, from 30 wt % to 80 wt % in another embodiment and from 40 wt % to 70 wt % in still another embodiment, based on the total amount of the components in the adhesive composition.

In some embodiments, the adhesive composition of the present invention can include (D) one or more additional optional conventional ingredients or additives, as Component D, including but are not limited to, for example, catalysts, tackifiers, plasticizers, rheology modifiers, adhesion promoters, antioxidants, fillers, colorants, pigments, surfactants, solvents, polymers (including, for example, thermoplastic resins other than those discussed herein above), dehydrating agents (including, for example, silanes), benzoyl chloride, other polyols (including, for example, fatty polyols), ultraviolet indicators, and combinations of two or more thereof.

As an illustrative embodiment, the adhesive composition may include, for example, an adhesion promoter. Non-limiting examples of suitable adhesion promoters include coupling agents such as a silane coupling agent, a titanate coupling agent, and an aluminate coupling agent; epoxy resin, phosphoric acid, polyphosporic acid, and phosphate esters.

Examples of the silane coupling agent useful in the present invention include, but are not limited to, aminosilanes such as γ-aminopropyltriethoxysilane, γ-aminopropyltrimethoxysilane, N-β(aminoethyl)-γ-aminopropyltrimethoxysilane, N-β(aminoethyl)-γ-aminopropyltrimethyl dimethoxysilane, and N-phenyl-γ-aminopropyltrimethoxysilane; epoxysilanes such as 3-(3,4-epoxycyclohexyl)-ethyltrimethoxysilane, γ-glycidoxypropyl-trimethoxysilane, and γ-glycidoxypropyltriethoxysilane; vinylsilanes such as vinyl tris(β-methoxyethoxy)silane, vinyltriethoxysilane, vinyltrimethoxysilane, and γ-methacryloxypropyltrimethoxysilane; hexamethyldisilazane; γ-mercaptopropyltrimethoxysilane; and mixtures thereof.

Examples of the titanate coupling agent useful in the present invention include, but are not limited to, tetraisopropoxy titanium, tetra-n-butoxy titanium, butyl titanate dimer, tetrastearyl titanate, titanium acetylacetonate, titanium lactate, tetraoctyleneglycol titanate, titanium lactate, tetra stearoxy titanium; and mixtures thereof.

Examples of the epoxy resin useful in the present invention include, but are not limited to, a variety of readily available epoxy resins such as bisphenol A-epichlorohydrin (epi-bis) type epoxy resin, novolak type epoxy resin, β-methylepichlorohydrin type epoxy resin, cyclic oxirane type epoxy resin, glycidyl ether type epoxy resin, glycidyl ester type epoxy resin, polyglycol ether type epoxy resin, glycol ether type epoxy resin, epoxidation fatty acid ester type epoxy resin, polycarboxylic acid ester type epoxy resin, aminoglycidyl type epoxy resin, resorcin type epoxy resin; and mixtures thereof.

In some embodiments, the adhesion promoter can be a phosphate ester compound. In other embodiments, the adhesion promoter is an epoxy silane ((3-glycidyloxypropyl)-trimethoxysilane). In some embodiments, phosphoric acid can be incorporated in the polyol component while epoxy silane can be incorporated in the isocyanate component. In some embodiments, both epoxy silane and phosphoric are incorporated in the polyol component.

In some embodiments, the average functionality of the adhesive composition (i.e., the isocyanate component together with the polyol component), excluding non-reactive components such as solvents, is from 2 to 2.5.

The amount of the optional Components D when used can be, for example, from 0 wt % to 15 wt % in one embodiment, from 0.01 wt % to 10 wt % in another embodiment and from 0.1 wt % to 5 wt % in still another embodiment, based on the total amount of components in the adhesive composition.

In one broad embodiment, the process of producing the adhesive composition includes mixing the isocyanate and polyol components described above to form a curable adhesive composition. It is contemplated that two parts, an isocyanate part and a polyol component part, is employed in the present invention. It is also contemplated that the isocyanate component and the polyol component of the disclosed adhesive composition can be made separately and, if desired, stored until it is desired to use the adhesive composition. In some embodiments, both the isocyanate component and the polyol component are each liquid at 25° C. When it is desired to use the adhesive composition, the isocyanate component and the polyol component are brought into contact with each other and mixed together, typically at a stoichiometric ration (NCO/OH) between 1 and 2.5. It is contemplated that when these two components are brought into contact, a curing reaction begins in which the isocyanate groups react with the hydroxyl groups to form urethane links. The adhesive composition formed by bringing the two components into contact can be referred to as a "curable mixture."

To form the adhesive composition, mixing of the two components may take place at any suitable time in the process of forming the adhesive composition and applying the adhesive to a substrate, such as before, during, or as a result of the application process. All of the present steps may be carried out under ambient room temperature conditions. As desired, heating or cooling may be employed. And, the mixing can be carried out using a suitable conventional mixer, such as using an electrically, pneumatically, or an otherwise powered mechanical mixer.

In a general embodiment, the process for preparing the solvent-based adhesive composition of the present invention includes, for example, the steps of (1) providing the isocyanate component; (2) providing the polyol component; (3) mixing the two components to form a resin mixture; (4) diluting the resin mixture in a solvent to form a diluted resin mixture having an application solid content of from 25 wt % to 55 wt % in one embodiment, from 30 wt % to 45 wt % in another embodiment, and from 35 wt % to 40 wt % in still another embodiment, based on the total weight of the diluted resin mixture; and (5) removing the solvent from the composition to form the adhesive composition before the composition is applied to a substrate and before the composition is cured.

Before the resin mixture is cured the mix ratio of the isocyanate component to the polyol component is from 100:1 to 100:12 in one embodiment, and from 100:4 to 100:10 in another embodiment.

Some of the advantageous properties exhibited by the solvent-based adhesive composition of the present invention includes, for example, (1) good adhesion performance; (2) fast curing; and (3) either (a) no level of migrated undesirable aromatic amines such as MDA and TDA, or (b) a low level of migrated undesirable aromatic amines such as MDA and TDA into food packed in packages using the adhesive.

For example, the dry bond of the adhesive before retort testing can be greater than 500 g/25 mm in one embodiment, from 500 g/25 mm to 2,500 g/25 mm in another embodiment, from 700 g/25 mm to 2000 g/25 mm in still another embodiment and from 800 g/25 mm to 1,800 g/25 mm in yet another embodiment.

For example, the bond of the adhesive after 1 hr of retort testing at 121° C. can be greater than 200 g/25 mm in one embodiment, from 200 g/25 mm to 2,500 g/25 mm in another embodiment and from 300 g/25 mm to 2,000 g/25 mm in still another embodiment. The bond can be dependent on the type of film substrate used and in some embodiments the films can be bonded where after testing the substrates failure mode occurs before the bond.

The curing time of the adhesive can be from 1 day to 8 days in one embodiment, from 1 day to 7 days in another embodiment and from 2 days to 7 days in still another embodiment.

A process of forming a laminate using the adhesive composition of the present invention is also disclosed herein. In some embodiments, the adhesive composition, such as the adhesive composition discussed above, is in a liquid state at 25° C. Even if the composition is solid at 25° C., it is acceptable to heat the composition as necessary to transform the composition into a liquid state. Solvent is added to the mixed adhesive composition until the desired solids content is reached. In general, a solids content of 50% or greater is used in one embodiment.

The adhesive composition of the present invention is useful for bonding substrates together; and the adhesive composition can be used on a wide variety of a single suitable substrate or a plurality of suitable substrates. The substrates may be similar materials or dissimilar materials. For example, in some embodiments, the substrate may be selected from high, low or medium density plastics (e.g., of a type selected from polystyrene, polyethylene, ABS, polyurethane, polyethylene terephthalate, polybutylene terephthalate, polypropylene, polyphenylene, polycarbonate, polyacrylate, polyvinyl chloride, polysulfone, and mixtures thereof), paper, wood and reconstituted wood products, polymer coated substrates, wax coated paperboard, cardboard, particle board, textiles, leather, and metal (e.g., aluminum, ferrous as well as other non-ferrous), metallized plastics (e.g., metallized plastic film) or the like.

Wet and dry bond lamination of a plurality of substrate layers is possible. The adhesive composition can be applied to desired substrates using conventional application techniques such as rotogravure printing, flexographic printing, conventional or airless spray, roll coating, brush coating, wire wound rod coating, knife coating, or coating processes such as curtain-, flood-, bell-, disc-, and dip-coating processes. Coating a substrate with the adhesive composition may be done over the entire surface of the substrate or to a portion of the substrate's surface, such as along an edge, or at intermittent locations. Once applied to the substrate, the adhesive composition is dried, such as by application of heat and air flow, or some other suitable conventional approach for removing substantially all remaining solvent present in the adhesive composition.

A laminate comprising the solvent-based adhesive composition of the present invention can be formed by applying the adhesive to at least one of two different substrates and combining the substrates together such that the adhesive is disposed between the surfaces of the two substrates; and then curing the adhesive to form a bond between the two substrates. The substrates can include, for example, two separate films; and each of the films can be made of a different material or of the same material. Generally, a layer of the adhesive composition is applied to a surface of a film. In one embodiment, the thickness of the layer of the curable adhesive composition mixture applied to a surface of a film is from 1 micron (μm) to 5 μm. As used herein, a "film" is any structure that is 0.5 mm or less in one dimension of the structure; and is 1 centimeter (cm) or more in both of the other two dimensions of the structure.

In some embodiments, a surface of another film is brought into contact with the layer of the curable mixture to form an uncured laminate. The curable mixture is then cured or allowed to cure. The uncured laminate may be subjected to pressure, for example by passing through nip rollers, which may or may not be heated. The uncured laminate may be heated to speed the cure reaction.

Suitable substrates used to form the laminate structure include films such as paper, woven and nonwoven fabric, polymer films, metal foil, metal-coated (metallized) polymer films, and combinations thereof. The substrates are layered to form a laminate structure, with an adhesive composition according to the present invention adhering one or more of the substrates together. Films can optionally have a surface on which an image is printed with ink. The ink may be in contact with the adhesive composition. In some embodiments, the films are polymer films and metal-coated polymer films, and in a preferred embodiment the films are polymer films. A "polymer film" is a film that is made of a polymer or mixture of polymers. The composition of a polymer film is, typically, 80 wt % or more of one or more polymers.

The adhesive composition is particularly attractive for packaging and sealing applications. For example, a plastic film, metal film, or metallized plastic film can be laminated (e.g., over all of its surface or at least a portion of its surface, such as along its edges, or at intermittent locations) with the adhesive composition of the present invention to form a laminate. In one preferred embodiment, the laminate is used, for example, to form a pouch made of at least two layers of film with the adhesive bonded inbetween the two film layers. In some embodiments, food may be packaged for boil-in-bag preparation, or the resulting laminate might be used for sealing or packaging some other article.

EXAMPLES

The following examples are presented to further illustrate the present invention in detail but are not to be construed as limiting the scope of the claims. Unless stated to the contrary, implicit from the context, or customary in the art, all parts and percentages are based on weight and all test methods are current as of the filing date of this disclosure.

Various raw materials or ingredients used in the Inventive Examples (Inv. Ex.) and the Comparative Examples (Comp. Ex.) are explained in Table I as follows:

TABLE I

| Raw Materials | | |
|---|---|---|
| Ingredient | Brief Description | Supplier |
| ISONATE ™ 125M | pure solid MDI | The Dow Chemical Company (Dow) |
| ADCOTE ™ 577 | polyester-rich isocyanate-terminated prepolymers with a solid concentration of 75 wt % | Dow |
| VORANOL ™ CP 450 | polyether polyol with a molecular weight of about 450 g/mol (triol) | Dow |
| POLYG ™ 30-112 | polyether polyol with a molecular weight of about 1,500 g/mol (triol) | Monument Company |
| Polyphosphoric acid | 115% polyphosphoric acid | Sigma Aldrich |
| Co-reactant CT | polyether-rich isocyanate-terminated compound based on MDI isocyanate | Dow |
| MOR-FREE ™ C33 | HDI-based aliphatic isocyanate with 100% solids | Dow |
| ADCOTE ™ 811AEA | polyurethane polyester polyol | Dow |
| 9L10 | IPDI-based aliphatic isocyanate with a solid concentration of 75 wt % | Dow |
| ethyl acetate | urethane grade solvent used for adhesive formulations | Fisher Scientific |

Examples 1 and 2 and Comparative Examples A and B—Adhesives

The ingredients of the adhesive formulations used in the Examples are described in Table II; and the adhesive formulations are prepared in accordance with the following procedures:

General Procedure for Preparing Phosphate Ester Compound

A 1 liter (L) multi-neck round bottom flask was dried in an oven, flushed with dry nitrogen ($N_2$) for 30 min, then charged with 150 grams (g) of VORANOL™ CP 450 polyether polyol and placed under an $N_2$ sweep of 70 milliliters per minute (mL/min). A syringe was loaded with 4 g of 115% Polyphosphoric acid (PPA). The PPA was added dropwise to the polyether polyol with strong agitation. A minimal temperature increase was observed. The reactor contents were heated to 100° C. for 1 hr then cooled to 45° C. Then, 40 g of ethyl acetate was added to the reactor, followed by a slow addition of 50 g of ISONATE™ 125M diisocyanate. A significant exotherm was controlled with the application of an ice batch to keep the reaction pot below 75° C. and development of a yellow to amber color was observed. The reactor was then maintained at 65° C. for 1 hr, at which point the content was cooled and packaged. The product had the following properties: 76.0% solids, a hydroxyl number (OHN) of 112 mg KOH/g, acid value (AV) of 19.0 mg KOH/g, and a viscosity at 25° C. of 1,665 millipascals-seconds (mPa-s).

General Procedure for Preparing the Isocyanate Component (Component A)

The pertinent ingredients for preparing the isocyanate-reactive components of Inventive Example 1 and Inventive Example 2 are described in Table II. Using the isocyanate component of Inventive Example 1 as a typical example for sample preparation, about 450 g of ADCOTE™ 577 and about 50 g of MOR-FREE™ C33 are charged into a glass reactor. The reactor is heated to about 40° C. and the resulting mixture is stirred for about 30 min at 40° C. Then, the resulting sample mixture is packaged and placed in storage for later use.

General Procedure for Preparing the Isocyanate-Reactive Component (Component B)

The pertinent ingredients for preparing the isocyanate-reactive components of Inventive Example 1 and Inventive Example 2 are described in Table II. Using the isocyanate-reactive component of Example 1 as a typical example for sample preparation, about 400 g of VORANOL™ CP450, about 40 g of POLYG™ 30-112 and about 360 g of phosphate ester compound are charged to a glass reactor. The reactor is heated to about 40° C. and the resulting mixture is stirred for about 30 min at 40° C. Then, the resulting sample mixture is packaged and placed in storage for later use.

General Procedure for Preparing the Adhesive Formulation

The pertinent ingredients for preparing the adhesive formulations including the isocyanate-reactive component, the isocyanate component and solvent are described in Table II. Using the adhesive of Inventive Example 1 as a typical example for an adhesive formulation sample preparation, about 1,000 g of isocyanate component (Component A), about 160 g of isocyanate-reactive component (Component B) and about 1,460 g of ethyl acetate are loaded into a plastic container. The materials are mixed using a mechanical mixer at room temperature (about 25° C.) for 30 min to obtain the formulated adhesive of Inventive Example 1.

TABLE II

| | Adhesive Formulations | | | |
|---|---|---|---|---|
| | Example No. of Adhesive Formulation (parts) | | | |
| Ingredient | Inv. Ex. 1 Ad* A1 | Inv. Ex. 2 Ad A2 | Comp. Ex. A Ad A3 | Comp. Ex. B Ad A4 |
| Component A (Isocyanate Side) | | | | |
| ADCOTE ™ 577 | 90 | 80 | | 100 |
| MOR-FREE ™ C33 | 10 | 20 | | |
| 9L10 | | | 8 | |
| Component B (Hydroxyl Side) | | | | |
| VORANOL ™ CP 450 | 8 | 12.75 | | 3.5 |
| POLYG ™ 30-112 | 0.8 | 1.28 | | 0.35 |
| Phosphate ester compound | 7.2 | 11.48 | | 3.15 |
| ADCOTE ™ 811AEA | | | 100 | |
| Solvent | | | | |
| Ethyl acetate | 146 | 168 | 92 | 125 |

*"Ad" stands for "adhesive".

Examples 3 and 4 and Comparative Examples C and D—Laminates

General Procedure for Preparing Laminates

Table III describes various films used in the Examples to prepare the laminates and the laminate samples using the adhesives described in Table II above. The laminates based on the solvent-based adhesives were produced via a Nordmeccanica Labo Combi 400 pilot coater at room temperature (about 25° C.). Polymer films were corona treated before lamination and an aluminum (Al) foil was used without corona treatment. The coat weight of each laminate was maintained at about 4.9 grams per square meter (g/m$^2$). The prepared laminates were subsequently cured in a controlled environment (e.g., at 25° C. and 50% relative humidity at 50° C.).

The Examples are prepared using films including a "Prelam" which is a 12 m (48 gauge) polyester ("PET") film laminated to a 0.00035 mil Al foil with ADCOTE™/Coreactant F at 3.26 g/m$^2$ (2.00 lbs/ream), commercially available from The Dow Chemical Company, and a cast polypropylene ("CPP") film with a thickness of 3 mil. (75 μm).

"PMT" stands for "partial metal transfer".

The initial or "green" bonds were tested as soon as possible after the laminate was made. Additional T-peel tests were conducted at the time intervals indicated below.

Curing Time

ATR was used to monitor the curing of the inventive and comparative adhesives in the Foil//CPP structure and the curing time for each adhesive used was determined when isocyanate peak disappeared from the ATR spectrum.

General Procedure for Preparing Pouches

Laminates were made from the Prelam//CPP as described above. One of the 9 inches×12 inches (23 cm×30.5 cm) sheets of laminate was folded over to give a double layer of about 9 inches×6 inches (23 cm×15.3 cm) such that the CPP film of one layer was in contact with the CPP film of the other layer. The edges of the folded laminate were trimmed on a paper cutter to give a folded piece of about 5 inches×7 inches (12.7 cm×17.8 cm). Two long sides and one short side of the folded piece was heat sealed at the edges to give a finished pouch with an interior size of 4 inches×6 inches (10.2 cm×15.2 cm). The heat sealing was done at 400° F. (204° C.) for 1 second (s) at a hydraulic pressure of 40 pounds per square inch (psi) (276 kilopascals [kPa]). Two or three pouches were made for each test.

TABLE III

Film Laminates

| Example No. | Brief Description of Film Sample Substrates | Film Laminate Sample Layered Structure |
| --- | --- | --- |
| Inv. Ex. 3 | First substrate is Prelam (Al foil side contacts Ad); second substrate is CPP; and adhesive is Ad* A1. Laminate is cured at 50° C. for 3 days. | Foil//Adhesive A1//CPP |
| Inv. Ex. 4 | First substrate is Prelam (Al foil side contacts Ad); second substrate is CPP; and adhesive is Ad A2. Laminate is cured at 50° C. for 3 days. | Foil//Adhesive A2//CPP |
| Comp. Ex. C | First substrate is Prelam (Al foil side contacts Ad); second substrate is CPP; and adhesive is Ad A3. Laminate was cured at 50° C. for 10 days. | Foil//Adhesive A3//CPP |
| Comp. Ex. D | First substrate is Prelam (Al foil side contacts Ad); second substrate is CPP; and adhesive is Ad A4. Laminate is cured at 50° C. for 3 days. | Foil//Adhesive A4//CPP |

*"Ad" stands for "adhesive".

Testing and Measurement Methods of Films

Bond Strength Measurement

The 90° T-peel test was carried out on laminate samples cut to 15 mm wide and 1-inch (25.4 mm) long strips and pulled on a Thwing Albert™ QC-3A peel tester equipped with a 50 Newtons (N) loading cell at a rate of 4 inches/min (101.6 mm/min) on the 1-inch (25.4 mm) strips. Three separate sample strips were tested and the results values of the three strips were averaged. When the two films in the laminate separated (peeled), the average of the force during the pull was recorded. If one of the films stretched or broke, the maximum force or force at break was recorded. The failure mode (FM) or mode of failure (MOF) was recorded according to the following designations:

"FS" stands for "film stretch".

"FT" stands for "film tears" (or breaks).

"DL" stands for "delaminated", which denotes that a secondary film separated from the primary film.

"AT" stands for "adhesive transfer", which denotes that the adhesive fails to adhere to the primary film and is transferred to the secondary film.

"AS" stands for "adhesive split" (or cohesive failure), which denotes that adhesive is found on both primary and secondary films.

"MT" stands for "metal transfer", which denotes that a transfer of metal from a metalized film to a secondary film occurred.

Testing and Measurement Methods of Pouches

Retort Performance Testing

The pouches prepared as described above were filled through the open edge with 100 milliliters (mL)±5 mL of distilled water (DI water) or 1:1:1 sauce (blend of equal parts by weight of ketchup, vinegar, and vegetable oil). Splashing the filling onto the heat seal area was avoided as this could cause the heat seal to fail during the test. After filling, the top of the pouch was sealed in a manner that minimized air entrapment inside of the pouch. The seal integrity was inspected on all four sides of pouches to ensure that there were no flaws in the sealing that would cause the pouch to leak during the test. Any defected pouches were discarded and replaced. In some cases, flaws in the laminate were marked to identify whether new additional flaws were generated during the testing.

The pouches, containing 1:1:1 sauce, were then placed in a STERIS autoclave set at 121° C. for 1 hr. The pouches were removed after retort and the extent of tunneling, blistering, de-lamination, or leakage was compared with any of the marked pre-existing flaws. The observations were recorded. The pouches were cut open, emptied, and rinsed with soap and water. One or more one-inch (2.54 cm) strips were cut from the pouches and the laminate bond strength was measured according to the standard bond strength test described above. This was done as soon as possible after removing the pouch contents. The interior of the pouches was examined visually and any visual defects were recorded.

Retort Regulatory Sample Preparation

The pouches consisting of 30.8 square inches ($in^2$) (198.7 square centimeters ($cm^2$)) of laminate each were filled with 100 mL 3% acetic acid per sample. The pouches were then transferred to the retort chamber where they were stored for 2 hr at 121° C. After testing and upon cooling to ambient temperature, the acetic acid was transferred to polyethylene bottles.

The acetic acid samples were extracted and prepared for analysis within days of preparation and analyzed via liquid chromatography/mass spectrometry (LC/MS) within 24 hr of preparation.

The above testing and measurement procedures were performed on the various samples prepared as described above. Table IV describes the performance of such samples.

TABLE IV

Performance of Film Samples

| | Example No. | | | |
|---|---|---|---|---|
| | Inv. Ex. 3 | Inv. Ex. 4 | Comp. Ex. C | Comp. Ex. D |
| Description of sample | Foil//Ad* A//3 mil CPP | Foil//Ad B//3 mil CPP | Foil//Ad C//3 mil CPP | Foil//Ad D//3 mil CPP |
| Dry bond before retort testing (g/25 mm) | 1,916; FT | 1,677; AT | 1,324; AT | 1,782; AT |
| Bond after 1 hr of testing at 121° C. (g/25 mm) | 1,058; AT | 730; AT | 293; AT | 1,458; AT |
| MDA level after 2 hr of testing at 121° C. (ppb) | 16.06 | 10.03 | 0 | 27.73 |
| Curing Time | 3 days at 50° C. | 3 days at 50° C. | 10 days at 50° C. | 3 days at 50° C. |

*"Ad" stands for "adhesive".

For solvent based adhesives, Inv. Ex. 1 and Inv. Ex. 2 demonstrate great chemical and temperature resistance. In addition, Inv. Ex. 1 and Inv. Ex. 2 demonstrate fast curing properties (e.g., 3 days at 50° C. to cure). Inv. Ex. 1 and Inv. Ex. 2 also show a low MDA level (e.g., <20 ppb after only 3 days curing at 50° C.).

Other Embodiments

In one embodiment, the present invention includes a solvent-based retort adhesive composition comprising: (A) at least one isocyanate compound, Component A, wherein the at least one isocyanate compound, Component A, comprises: a blend of: (i) at least one aliphatic-based isocyanate and (ii) at least one aromatic-based isocyanate; and (B) at least one isocyanate-reactive component, Component B, wherein the at least one isocyanate-reactive component, Component B, comprises: (i) at least one phosphate ester compound and (ii) at least one polyether polyol having an average molecular weight of less than 1,500 g/mol.

In another embodiment, the at least one aliphatic-based isocyanate, component (i) of Component A of the adhesive, is selected from the group consisting of xylylene diisocyanate-based polyisocyanate, 1,4- or 1,3-bis(isocyanatomethyl)cyclohexane-based polyisocyanate, xylylene diisocyanate isocyanurate, hexamethylene diisocyanate-based polyisocyanate, diisocyanatodicyclohexylmethane-based polyisocyanate, hexamethylene diisocyanate isocyanurate; and mixtures thereof.

In another embodiment, the at least one aromatic-based isocyanate, component (ii) of Component A of the adhesive, is selected from the group consisting of 1,3- and 1,4-phenylene diisocyanate, 1,5-naphthylene diisocyanate, 2,6-tolulene diisocyanate, 2,4-tolulene diisocyanate, 2,4'-diphenylmethane diisocyanate, 4,4'-diphenylmethane diisocyanate, 3,3'-dimethyl-4,4'-biphenyldiisocyanate, polymeric isocyanates; and mixtures thereof.

In another embodiment, the at least one aromatic-based isocyanate, component (ii) of Component A of the adhesive, is an isocyanate prepolymer comprising a reaction product of: (α) at least one isocyanate compound and (β) at least one polyol compound. And, in another embodiment, the at least one isocyanate compound, component (α), is selected from the group consisting of aromatic polyisocyanates, aliphatic polyisocyanates, cycloaliphatic polyisocyanates, and mixtures thereof. And, in another embodiment, the polyol compound, component (β), is selected from the group consisting of a polyether polyol, a polyester polyol, a polycaprolactone polyol, a polyacrylate, a polycarbonate polyol, a natural oil-based polyol, and mixtures thereof.

In another embodiment, the polyether polyol, component (β), has a molecular weight of less than 5,000 g/mol. And, in another embodiment, the polyester polyol, component (β), has a molecular weight of greater than 1,500 g/mol.

In another embodiment, the isocyanate content of the at least one isocyanate compound, Component A, without solvent is from 1 weight percent to 25 weight percent.

In another embodiment, the at least one phosphate ester compound, component (i) of Component B of the adhesive, is selected from the group consisting of: a phosphate ester compound having the following Structure (I):

Structure (I)

wherein $R^1$ is an organic group, wherein $R^1$ may or may not have one or more additional pendant —OH groups, wherein $R^1$ may or may not have one or more additional pendant groups of Structure (I), and wherein two or more of the —OH groups and the group(s) of Structure (I) may or may not be attached to the same atom of $R^1$; a phosphate ester compound containing urethane linkages; and mixtures thereof. And, in another embodiment, the content of the at least one phosphate ester compound, component (i) of Component B of the adhesive, is from 0.1 weight percent to 30 weight percent.

In another embodiment, the at least one polyether polyol, component (ii) of Component B of the adhesive, is selected from group consisting of polypropylene glycols, polytetramethylene ether glycols, polybutylene oxide-based polyols, mixtures thereof, and copolymers thereof.

In another embodiment, the at least one isocyanate-reactive component, Component B of the adhesive, includes further (iii) at least one polyester polyol having an average molecular weight of less than 1,500 g/mol.

In another embodiment, the at least one polyester polyol, component (iii) of Component B of the adhesive, is selected from the group consisting of aliphatic polyester polyols, aromatic polyester polyols, copolymers of aliphatic and aromatic polyester polyols, polycarbonate polyols, polycaprolactone polyols, and mixtures thereof.

In another embodiment, the at least one polyester polyol, component (iii) of Component B of the adhesive, is: (1) the reaction product of a polybasic acid and a polyhydric alcohol, (2) the reaction product of phosgene or a carbonate monomer with a polyhydric alcohol; or (3) produced via ring opening polymerization of cyclic ester compounds.

In another embodiment, the adhesive of the present invention further comprises: (C) a solvent selected from the group consisting of ethyl acetate, methyl ether ketone, toluene, and mixtures thereof.

In another embodiment, the adhesive of the present invention further comprises: (D) an additive selected from the group consisting of a catalyst, a surfactant, a leveling agent, a defoamer, a rheology modifier, a color pigment, and mixtures thereof.

What is claimed is:

1. A solvent-based retort adhesive composition consisting of:
   (A) at least one isocyanate compound, Component A, consisting of a blend of: (i) at least one aliphatic-based isocyanate and (ii) from 30 wt % to 90 wt % of at least one aromatic-based isocyanate based on the total wt % of Component A;
   (B) at least one isocyanate-reactive component, Component B, consisting of:
   (i) at least one phosphate ester compound,
   (ii) a first polyether polyol having an average molecular weight of about 1,500 g/mol, and
   (iii) a second polyether polyol having an average molecular weight from 250 g/mol to less than 1,000 g/mol; and
   (C) a solvent.

2. The adhesive of claim 1, wherein the at least one aromatic-based isocyanate, component (ii) of Component A, is an isocyanate prepolymer comprising a reaction product of: (α) at least one isocyanate compound and (β) at least one polyol compound.

3. The adhesive of claim 1, wherein the at least one phosphate ester compound, component (i) of Component B, is selected from the group consisting of: a phosphate ester compound having the following Structure (I):

Structure (I)

wherein $R^1$ is an organic group, wherein $R^1$ may or may not have one or more additional pendant —OH groups, wherein $R^1$ may or may not have one or more additional pendant groups of Structure (I), and wherein two or more of the —OH groups and the group(s) of Structure (I) may or may not be attached to the same atom of $R^1$; a phosphate ester compound containing urethane linkages; and mixtures thereof.

4. The adhesive of claim 1, wherein at least one of the first polyether polyol and the second polyether polyol of Component B, is selected from group consisting of polypropylene glycols, polytetramethylene ether glycols, polybutylene oxide-based polyols, mixtures thereof, and copolymers thereof.

5. The adhesive of claim 1, wherein the at least one isocyanate compound, Component A, consists of (i) 20 wt % of the at least one aliphatic-based isocyanate and (ii) 80 wt % of the at least one aromatic-based isocyanate.

6. The adhesive of claim 1 wherein the aliphatic-based isocyanate consists of hexamethylene diisocyanate.

7. The adhesive of claim 1, wherein the at least one isocyanate compound, Component A, consists of (i) 10 wt % of the at least one aliphatic-based isocyanate and (ii) 90 wt % of the at least one aromatic-based isocyanate.

8. The adhesive of claim 1, wherein the at least one isocyanate reactive compound, Component B has an average hydroxyl group functionality from 1.8 to 4.0.

9. The adhesive of claim 1, wherein the phosphate ester is present in an amount from 20 wt % to 60 wt %, based on dry weight of the isocyanate-reactive component, Component B.

10. The adhesive of claim 1 wherein the first polyether polyol is a first polypropylene glycol; and
the second polyether polyol is a second polypropylene glycol.

11. The adhesive of claim 10 wherein the first polypropylene glycol is a first triol; and
the second polypropylene glycol is a second triol.

12. The adhesive of claim 1 wherein the solvent is present and the solvent is selected from the group consisting of ethyl acetate, methyl ether ketone, toluene, and mixtures thereof.

13. The adhesive of claim 1 wherein Component (B) contains more of the second polyether polyol than the first polyether polyol.

14. A solvent-based retort adhesive composition consisting of:
   (A) an isocyanate compound, Component A, consisting of a blend of
   (i) at least one aliphatic-based isocyanate, and
   (ii) from 30 wt % to 90 wt % of at least one aromatic-based isocyanate based on the total wt % of Component A;
   (B) an isocyanate-reactive component, Component B, consisting of
   (i) a phosphate ester compound,
   (ii) a first polyether polyol, and
   (iii) a second polyether polyol different than the first polyether polyol.

15. The adhesive composition of claim 14 wherein
the first polyether polyol (B)(i) has an average molecular weight of about 1,500 g/mol; and
the second polyether polyol has an average molecular weight from 250 g/mol to less than 1000 g/mol.

16. The adhesive composition of claim 15 wherein
the first polyether polyol (B)(i) is a first polypropylene glycol; and
the second polyether polyol (B)(ii) is a second polypropylene glycol.

17. The adhesive composition of claim 16 wherein
the first polypropylene glycol is a first triol; and
the second polypropylene glycol is a second triol.

18. The adhesive of claim 17 wherein Component (A) consists of 90 wt % of the aromatic-based isocyanate and 10 wt % of the aliphatic-based isocyanate.

19. The adhesive of claim 17 wherein Component (A) consists of 80 wt % of the aromatic-based isocyanate and 20 wt % of the aliphatic-based isocyanate.

20. The adhesive composition of claim 17 wherein the solvent is present and the solvent is selected from the group consisting of ethyl acetate, methyl ether ketone, toluene, and mixtures thereof.

* * * * *